United States Patent
Li et al.

(10) Patent No.: US 12,523,397 B2
(45) Date of Patent: Jan. 13, 2026

(54) APPLICATION OF AMMONIUM ION-CONTAINING HALOGEN COMPOUND IN SOLID-STATE REFRIGERATION

(71) Applicant: INSTITUTE OF METAL RESEARCH, CHINESE ACADEMY OF SCIENCES, Liaoning (CN)

(72) Inventors: Bing Li, Shenyang (CN); Ji Qi, Shenyang (CN); Zhidong Zhang, Shenyang (CN)

( * ) Notice: Subject to any disclaimer, the term of this patent is extended or adjusted under 35 U.S.C. 154(b) by 111 days.

(21) Appl. No.: 18/578,706

(22) PCT Filed: Jul. 12, 2022

(86) PCT No.: PCT/CN2022/105057
§ 371 (c)(1),
(2) Date: Jan. 11, 2024

(87) PCT Pub. No.: WO2023/001018
PCT Pub. Date: Jan. 26, 2023

(65) Prior Publication Data
US 2024/0318874 A1    Sep. 26, 2024

(30) Foreign Application Priority Data
Jul. 23, 2021 (CN) .......................... 202110837618.3

(51) Int. Cl.
*C09K 5/06* (2006.01)
*F25B 9/00* (2006.01)

(52) U.S. Cl.
CPC ................ *F25B 9/006* (2013.01); *C09K 5/06* (2013.01)

(58) Field of Classification Search
CPC . F25B 9/002; F25B 9/006; F25B 1/00; C09K 5/02; C09K 5/06; C09K 5/14
See application file for complete search history.

(56) References Cited

U.S. PATENT DOCUMENTS

| | | | | |
|---|---|---|---|---|
| 2,182,098 A | * | 12/1939 | Sellew ................... | F25B 15/12 62/85 |
| 5,261,241 A | * | 11/1993 | Kitahara ................. | C09K 5/06 165/104.12 |
| 5,582,020 A | * | 12/1996 | Scaringe ................ | C09K 5/041 62/476 |
| 2022/0299242 A1 | * | 9/2022 | Faramarzi ............. | F25B 23/003 |

* cited by examiner

*Primary Examiner* — Marc E Norman
(74) *Attorney, Agent, or Firm* — Tsz Lung Yeung

(57) ABSTRACT

The present invention aims to provide an application of an ammonium ion-containing halogen compound in solid-state refrigeration and a novel efficient solid-state refrigeration method driven by a pressure. The ammonium ion-containing halogen compound is characterized in that phase change can be induced with only a small pressure, resulting in a huge barocaloric effect, and the unit pressure thereof drives the phase-change temperature displacement as high as 0.81 $Kmin^{-1}$. Ammonium iodide produces 89.07 $J\ kg^{-1}K^{-1}$ isothermal entropy change under a pressure of 20 MPa; and the use of this material for a refrigeration cycle is far superior to other material systems having a barocaloric effect.

5 Claims, 4 Drawing Sheets

APPLICATION OF AMMONIUM ION-CONTAINING HALOGEN COMPOUND IN SOLID-STATE REFRIGERATION

CROSS REFERENCE OF RELATED APPLICATION

This is a U.S. National Stage under 35 U.S.C. 371 of the International Application Number PCT/CN2022/105057, filed Jul. 12, 2022, which claims priority under 35 U.S.C. 119 (a-d) to Chinese application numbers 202110837618.3, filed Jul. 23, 2021, the mentioned patent applications are hereby incorporated by reference in their entities.

FIELD OF INVENTION

The present invention relates to the filed of solid-state refrigeration applications, and more particularly to the application of an ammonium ion-containing halogen compound in solid-state refrigeration.

DESCRIPTION OF RELATED ARTS

The application of refrigeration technology has already involved may aspects of our human lives. From the early 20th century to the present, the gas compression refrigeration technology has been widely used in the operation, production, storage, transportation in industries, as well as in the civil fields such as air conditioning and refrigerators. However, with the introduction of energy-saving and emission reduction requirements, carbon emissions have been gradually restricted. The drawbacks of gas compression refrigeration technology have gradually emerged, because its use of fluorocarbons, carbon fluorides, hydrofluorocarbons, etc. as refrigerants severely damages the ozone layer and exacerbates the greenhouse effect, and thus results in harm to the natural environment. In response to the requirements of sustainable development, it is urgent to find a new type of refrigeration technology that is green, environmentally friendly, and energy efficient.

Based on this background, the solid-state refrigeration technology with features such as green, energy saving, high efficient and environmental protection has entered people's field of vision. Currently discovered solid-state refrigeration technologies include magnetocaloric refrigeration, electrocaloric refrigeration, elastocaloric refrigeration, and barocaloric refrigeration technologies, which are respectively driven by magnetic fields, electric fields, uniaxial stress fields, and isostatic pressure to induce material phase transitions, so as to form a heat release and heat absorption cycle to achieve refrigeration effects. These refrigeration technologies have attracted extensive research and attention and are likely to replace the conventional gas compression refrigeration technologies. Among them, the advantages of barocaloric refrigeration technology are particularly prominent. The selection of materials for this technology is universal, and a large number of materials with first-order phase transitions within the appropriate temperature range can be used as working fluids for barocaloric refrigeration. The heat absorption and heat release effects are achieved by controlling them with isostatic pressure. Moreover, the barocaloric refrigeration cycle is compatible with the refrigeration cycle equipment of conventional gas compressors, so that it has obvious advantages in large-scale applications.

Moreover, the intrinsic entropy change values of the materials used in the other three refrigeration methods still have a significant gap from practical applications. For example, using an external magnetic field of 5 T to regulate the magnetic phase transition in alloys of $La(FeSi)_{13}$ and $Gd_5Ge_2Si_2$ can result in an entropy change of about 20 J $kg^{-1}K^{-1}$. The entropy change value, as well as the extremely high driving field, are difficult to meet the requirements of practical applications. Only by finding new refrigerants with larger entropy change and lower driving field, the refrigeration capacity of solid-state refrigeration technology can be improved.

SUMMARY OF THE PRESENT INVENTION

The object of the present invention is to provide a new efficient refrigeration method that can be driven by pressure by adopting a class of halogen compounds containing ammonium ions as refrigerants. The present invention uses the halogen compound as the refrigerant, applies lower pressure to drive its complete phase transition and generates a huge heat effect, thereby achieving solid-state refrigeration.

When this class of halogen compounds containing ammonium ions undergoes a first-order phase transition from solid to solid, the ammonium ion unit exhibits severe orientation disorder, and the orientation of the unit is random, the rotational time scale is in the picosecond range, and an ultrafast disorder is shown. This ultrafast disorder phase transition can generate a huge heat effect, produce a relatively large entropy change, and have a large latent heat of phase transition. At the same time, this phase transition is a reversible phase transition. When the reverse phase transition occurs, a large amount of heat can be absorbed to achieve the purpose of refrigeration, making the halogen compounds containing ammonium ions be excellent refrigerants.

A technical solution of the present invention is an application of an ammonium-ion containing halogen compound in solid-state refrigeration, wherein the ammonium-ion containing halogen compound is one or more of $NH_4I$, $NH_4Cl$, $NH_4Br$.

As a preferred technical solution, $NH_4I$ (Ammonium iodide) is working as a refrigerant, an application temperature range of $NH_4I$ is 268-332K, a phase transition temperature of $NH_4I$ is highly sensitive to pressure, and its unit pressure can drive a phase transition temperature shift of up to 0.81 $KMPa^{-1}$. When a hydrostatic pressure is 20 MPa, an isothermal entropy change of $NH_4I$ driven by static pressure is 89.07 J $kg^{-1}K^{-1}$, so that it is particularly suitable for use as a refrigerant.

The present invention further provides a solid-state refrigeration method based on ammonium ion-containing halogen compound and driven by a static pressure, the method comprises a step of using one or more of $NH_4I$, $NH_4Cl$, $NH_4Br$ as refrigerants to achieve heat transfer and refrigeration effect by controlling the loading and releasing of pressure to form refrigeration cycles.

The driving force in the method of the present invention is an equal static pressure, and both a piston system and a high-pressure system can be used as the driving force for this refrigeration method.

In the ammonium ion-containing halogen compound described in the present invention, the ammonium ion unit has orientation disorder. Using the ammonium ion-containing halogen compound as the refrigerant, a refrigeration cycle as shown in FIG. 1 is designed.

The preferred ammonium ion-containing halogen compound is $NH_4I$, the material state is shown in FIG. 2.

The method described in the present invention relates to structural transformation. FIG. 3 are schematic views illustrating the crystal structure before and after the phase transition of NH₄I. The material has a first-order phase transition, with phase I at room temperature, it has a cubic crystal structure and a space group of $Fm\overline{3}m$. It transforms into phase II at low temperatures, and is still maintaining a cubic structure with a space group of $Pm\overline{3}m$. The first-order phase transition occurs at 267 K during heating, and occurs at 242K during cooling.

In the solid-state refrigeration method based on ammonium ion-containing halogen compound and driven by a static pressure of the present invention, the method is driven by a hydrostatic pressure and the applied pressure does not exceed 80 MPa. (A preferred driving pressure is 30 MPa-60 MP).

A temperature range of the ammonium ion-containing halogen compound of the present invention is 268-332 K.

In the method of the present invention, the most preferred refrigerant is NH₄I which can achieve an isothermal entropy change of 89.07 $J\ kg^{-1}K^{-1}$ at a low pressure of 20 MPa, as shown in FIG. 5.

The key to the present invention is the ordered-to-disordered transition of the ammonium ion orientation before and after the phase transition, the ammonium ion-containing halogen compound is an inorganic plastic crystal material with a pressure-thermal effect. When pressure is applied to such a material, the pressure-thermal material will release heat to the environment, and when the pressure is released, the pressure-thermal material will absorb heat from the load, so as to achieve the purpose of refrigeration.

The beneficial effects of the present invention are as follows.

First of all, the ammonium ion-containing halogen compound of the present invention can undergo a complete phase transition with extremely low equilibrium pressure. When the pressure is applied to 80 MPa, the temperature of the phase transition increases from 268K to 332K, with a displacement of up to 64K. The temperature displacement driven by unit pressure is as high as 0.81 K $MPa^{-1}$, as shown in FIG. 6. Based on the above phenomenon, a static pressure of 20 MPa can completely induce the phase transition of NH₄I, with a saturated entropy change value as high as 89.07 $J\ kg^{-1}K^{-1}$.

Secondly, the refrigerant used in the present invention is a halogen compound containing ammonium ion. This type of material has a simple structure, low cost, and can be produced in a large scale.

Thirdly, the solid-state refrigeration effect of the present invention can be achieved through a compression cycle, which is similar to the existing gas compression refrigeration cycle system. It can achieve compatibility and substitution, and has the advantage of directly replacing the refrigerant with this type of material based on compression refrigeration.

DETAILED DESCRIPTION OF THE PREFERRED EMBODIMENT

Example 1

10 MPa Refrigeration Effect:

The refrigerant ammonium iodide was put into an airtight high-pressure sample chamber, and at the same time, an empty sample chamber was put into a sample cavity of a μDSC7 (produced by Setaram, France) microcalorimeter for comparison. Nitrogen gas was introduced into the two sample chambers using a pressurizing device, while maintaining atmospheric pressure (0.1 MPa), cooled from 343K to 248K at a cooling rate of 1 $Kmin^{-1}$, and then heated to 343K, the thermal flow data of the sample was recorded, as shown in the first curve on the left in FIG. 4. Next, the pressure of the gas was increased to 10 MPa, and the above process was repeated to obtain the data as shown in the second curve in FIG. 4. The thermal flow data was converted into entropy change data, and the difference between the two curves was the entropy change from 0.1 MPa to 10 MPa, with a maximum value of −82.67 $J\ kg^{-1}K^{-1}$.

Example 2

Figure 1:
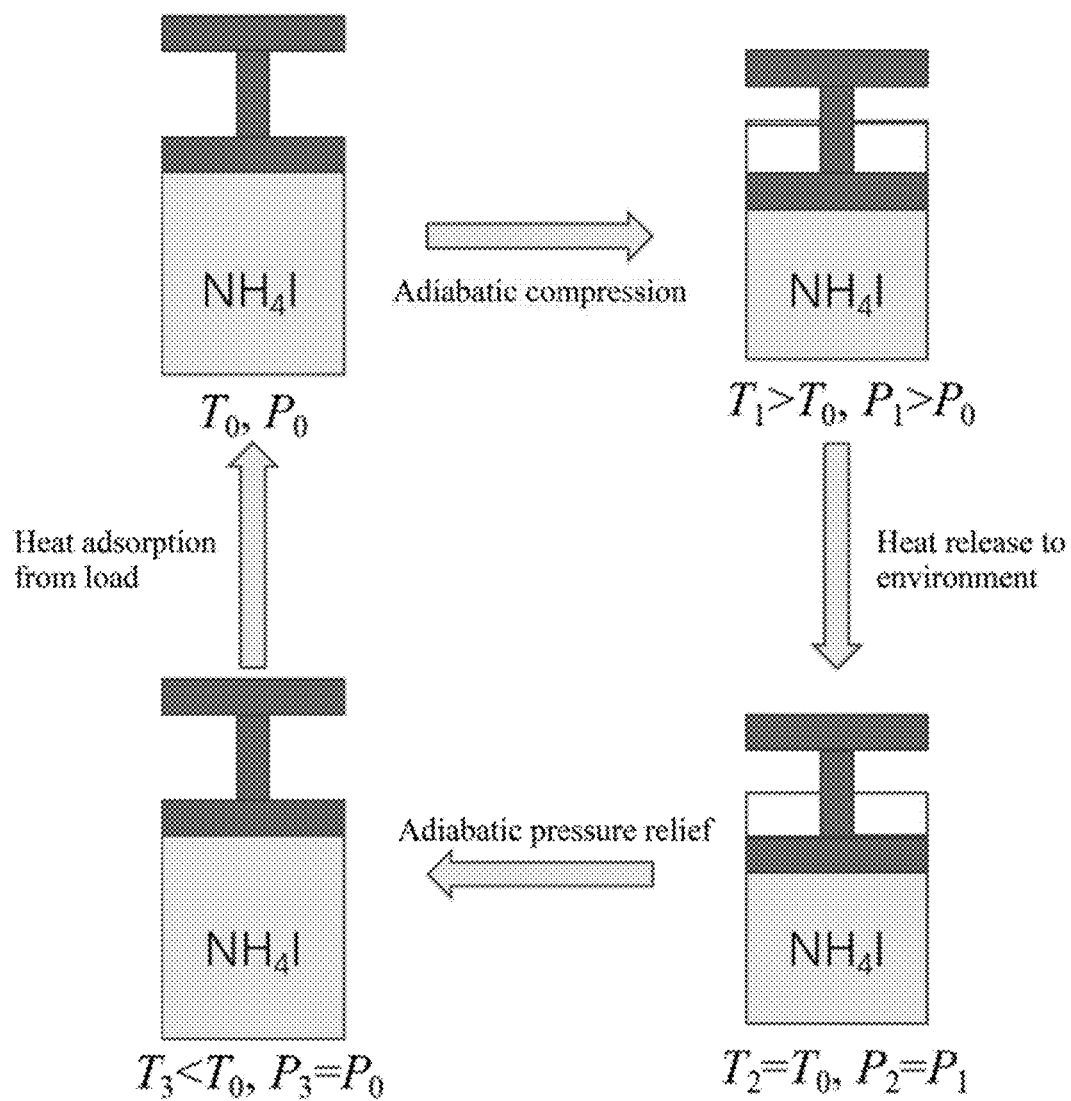
FIG. 1 is a flow diagram illustrating the process of compression refrigeration cycle using an ammonium-ion containing halogen compound.
Figure 2:
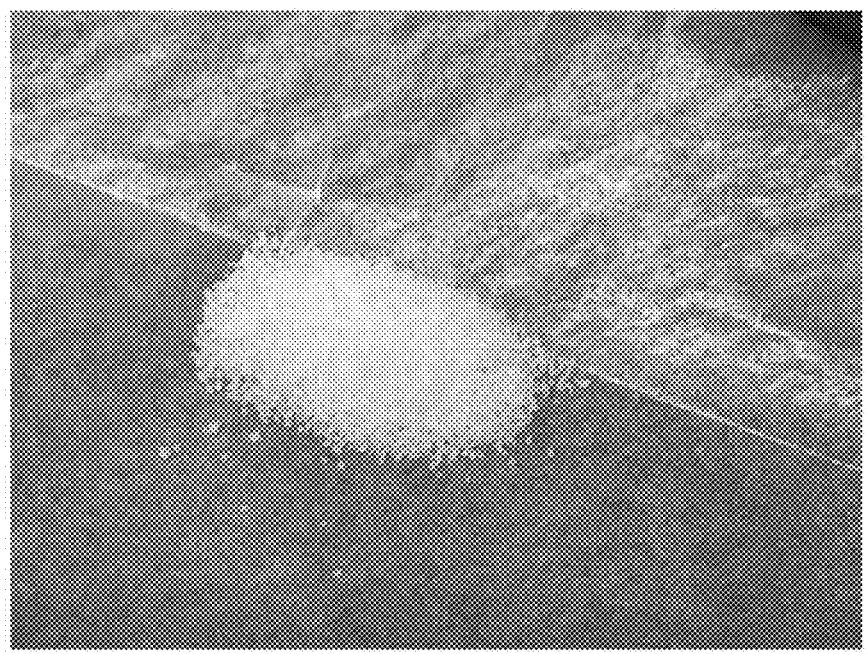
FIG. 2 is a photograph of NH₄I powder sample.
Figure 3:
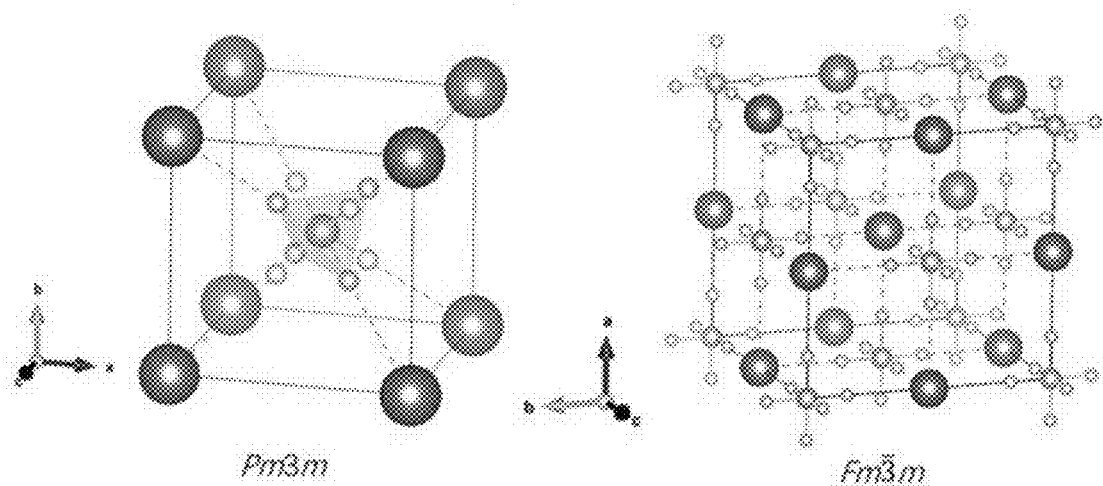
FIG. 3 are schematic views illustrating the crystal structure before and after the phase transition of NH₄I.
Figure 4:
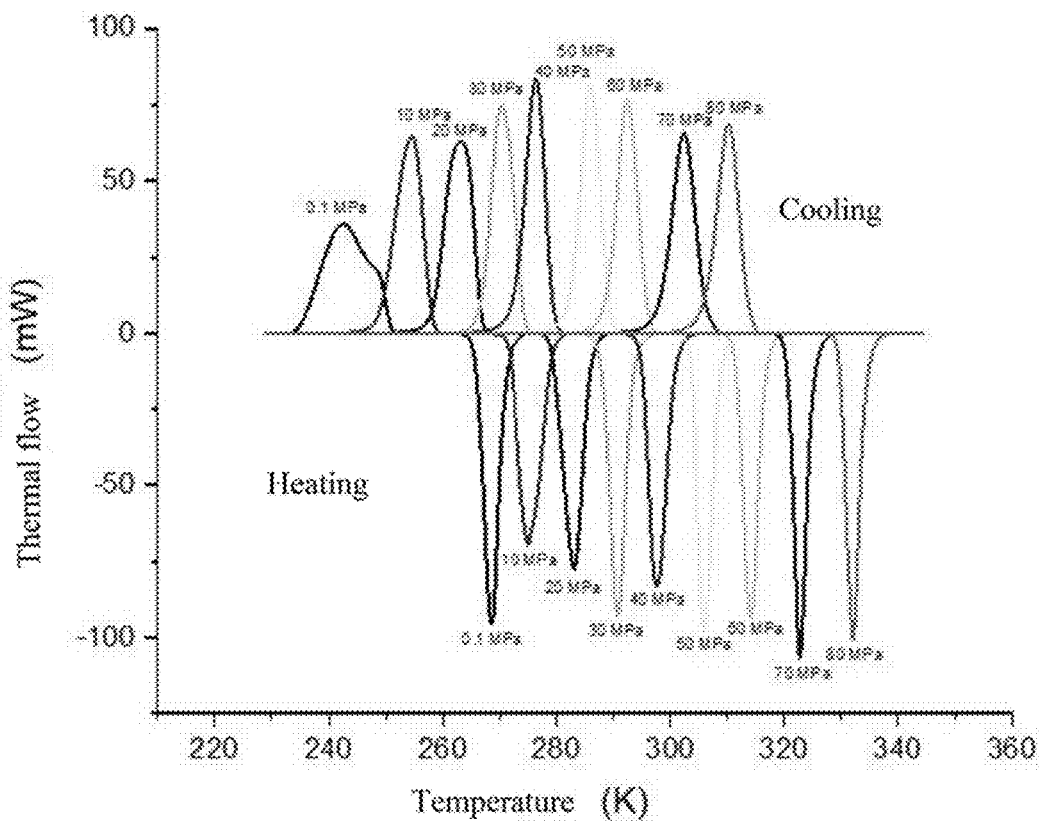
FIG. 4 illustrates thermal flow curves of NH₄I at different pressures, from left to right, 0.1, 10, 20, 30, 40, 50, 60, 70, and 80 MPa.
Figure 5:
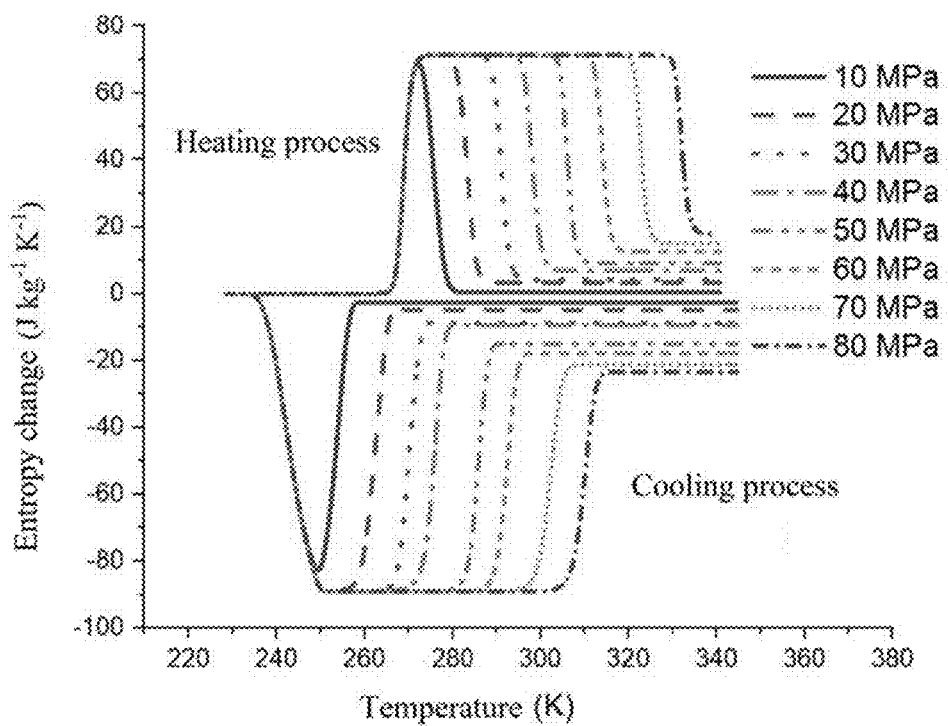
FIG. 5 illustrates entropy change curves of NH₄I at different pressures, from left to right, 10, 20, 30, 40, 50, 60, 70, and 80 MPa.
Figure 6:
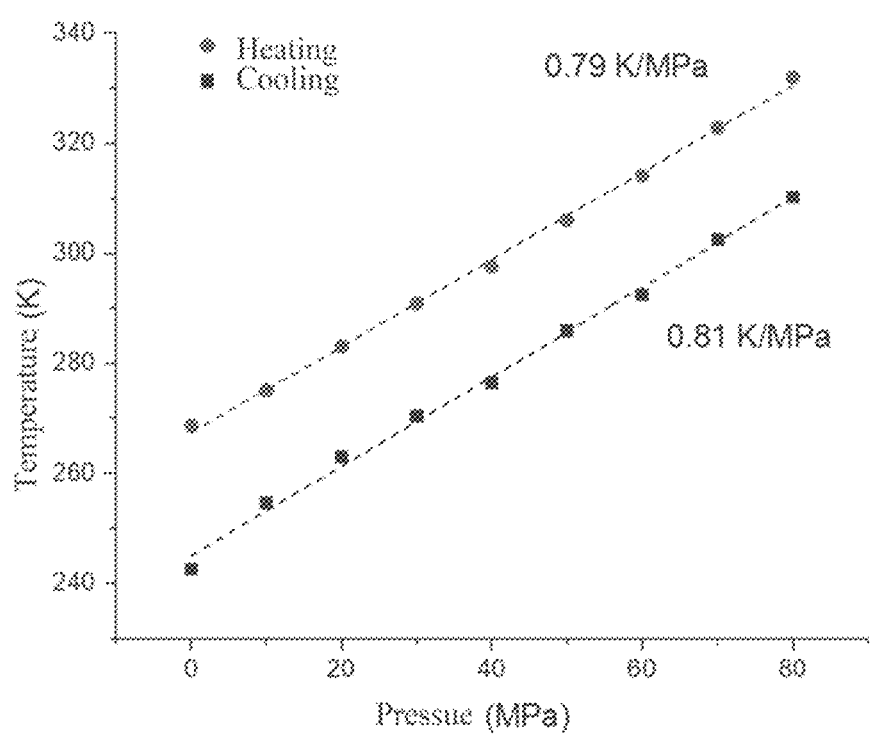
FIG. 6 illustrates a phase transition temperature curve of NH₄I with pressure variation.

Saturation Trend of Refrigeration Effect:

The refrigerant ammonium iodide was put into the airtight high-pressure sample cell, and at the same time, a reference sample cell was put into the sample chamber of the μDSC7 microcalorimeter. A high-pressure gas control panel was used to introduce pure nitrogen gas and maintain a constant gas pressure of 1 atmosphere (0.1 MPa), the temperature was decreased from 343K to 248K with a cooling rate of 1 $Kmin^{-1}$, and then the temperature was further increased to 343K. The thermal flow data of sample was recorded, as shown in the first curve of FIG. 4. Next, the pressure of the gas was respectively increased to 20 MPa, 30 MPa, 40 MPa, 50 MPa, 60 MPa, 70 MPa, 80 MPa, and the above measurement process was repeated, and the data was obtained as shown in FIG. 4. The heat flow data was converted to entropy change data, the two lines were subtracted to obtain the entropy changes corresponding to the occasions when the pressure was respectively increased from 0.1 MPa to 10 MPa, 20 MPa, 30 MPa, 40 MPa, 50 MPa, 60 MPa, 70 MPa, 80 Mpa, as shown in FIG. 5. As can clearly be seen that a saturation trend was presented when the pressure was close to 20 MPa. This characteristic determines that a larger entropy change can be released using a smaller pressure.

Example 3

Refrigeration Cycle:

A cavity of the compressed refrigeration cycle system was filled with the refrigerant ammonium iodide, and under adiabatic conditions with the temperature was 268K and under atmospheric pressure (0.1 MPa), the ammonium iodide refrigerant was applied with a static pressure of 40 MPa to raise its temperature to 278K; the pressure was maintained at 40 MPa, the refrigerant ammonium iodide was brought into contact with the environment through a heat exchange fluid, and after heat transfer with the environment, it reached equilibrium with the ambient temperature and cooled down to 268K; under adiabatic conditions, the pressure of ammonium iodide refrigerant was reduced to atmospheric pressure (0.1 MPa), the temperature was decreased to 258K; a cooling effect was achieved by absorbing heat from the load with refrigerant.

The above embodiments are only for illustrating the technical ideas and features of the present invention. The purpose is to enable those skilled in the art to understand the content of the present invention and implement it accordingly, and should not be construed as limiting the scope of the present invention. Any equivalent changes or modifications made in accordance with the essence of the present invention should be encompassed within the scope of the present invention.

What is claimed is:

1. A solid-state refrigeration refrigerant, comprising $NH_4I$, wherein when a hydrostatic pressure is 20 MPa, an isothermal entropy change driven by the hydrostatic pressure is 89.07 $Jkg-1$ $K-1$, a phase transition temperature driven by unit pressure is dP/dT which is 0.81 $KMPa-1$.

2. A solid-state refrigeration method, comprising a step of using one or more of $NH_4I$, $NH_4Cl$, and $NH_4Br$ as refrigerants to achieve heat transfer and refrigeration effect, wherein the method is driven by a hydrostatic pressure which does not exceed 80 MPa.

3. The solid-state refrigeration method according to claim 2, wherein the hydrostatic pressure is 30 MPa-60 MPa.

4. A solid-state refrigeration method, comprising a step of using $NH_4I$ as a refrigerant to achieve heat transfer and refrigeration effect, wherein an application temperature range is 268-332K, wherein the method is driven by a hydrostatic pressure which does not exceed 80 MPa.

5. The solid-state refrigeration method according to claim 4, wherein the hydrostatic pressure is 30 MPa-60 MPa.

* * * * *